UNITED STATES PATENT OFFICE.

MILTON C. WHITAKER, OF NEW YORK, N. Y., AND JOHN S. BATES, OF BOSTON, MASSACHUSETTS, ASSIGNORS OF ONE-HALF TO ARTHUR D. LITTLE, INCORPORATED, OF BOSTON, MASSACHUSETTS, A CORPORATION OF MASSACHUSETTS.

PROCESS OF TREATING RESINOUS WOODS.

1,142,922.  Specification of Letters Patent.  Patented June 15, 1915.

No Drawing.   Application filed October 29, 1913.  Serial No. 798,030.

*To all whom it may concern:*

Be it known that we, (1) MILTON C. WHITAKER and (2) JOHN S. BATES, (1) a citizen of the United States, (2) a subject of the King of Great Britain, residing at (1) New York, county and State of New York, (2) Boston, county of Suffolk, and State of Massachusetts, have invented new and useful Improvements in Processes of Treating Resinous Woods, of which the following is a specification.

This invention relates to processes of treating resinous woods, the object of the invention being to provide an economical and efficient process of treating such woods, with recovery of practically their entire content of turpentine and resin, the residual wood being well adapted for conversion into paper pulp.

The process depends primarily upon the observed fact that wood-resins are soluble in dilute solutions of caustic soda or equivalent alkali, but may be precipitated from such solutions in the form of resin soaps by the addition of further proportions of alkali.

The process may be carried out as follows: The resinous wood, preferably in the form of chips as commonly used for the manufacture of paper pulp, is treated with a caustic soda solution of such dilution, and used in such proportion, that it is capable of dissolving all of the resins and of combining with such other constituents of the wood as may be attacked during the solution of the resins. The concentration of this caustic soda solution, and the quantity employed, are so chosen with reference to the resin content of the wood that only a small quantity of free alkali, preferably not exceeding 0.5 to 1.0 per cent. by weight of the solution, remains after the solution of the resins. The treatment is preferably carried out in closed digesters at the boiling-point of the solution under about twenty pounds pressure. The vapors are preferably led to a suitable condensing system for recovery of the turpentine.

After the distillation of the turpentine and the solution of the rosin is complete, the solution is drained from the chips and the latter are washed, either with hot water or with a dilute solution of alkali, to reclaim the remaining solution. The washings may be used for the preparation of a liquor for the treatment of fresh chips, or they may be added to the main solution. To this main solution, whether or not the washings have been added thereto, is now added sufficient caustic soda to bring the concentration to a suitable point for the separation of the resin soaps, say approximately six per cent. NaOH. The resin soap separates at normal temperatures in a state of substantial purity and with substantial completeness. The precipitated soaps are recovered by decantation or filtration, and may be further treated as desired.

The above described treatment of the chips with the weak alkaline solution dissolves not only the resinous bodies, but as well certain other wood constituents which, for the sake of brevity, are herein termed, "humus." The humus is not precipitated with the resins, but remains in solution in the stronger alkali. This reinforced alkaline solution, containing the humus, but substantially free from resinous bodies, or containing the same only in minor proportions, is directly available for the treatment, for the preparation of paper pulp, of the chips from which the turpentine and resinous bodies have been removed. The pulping treatment may be conducted in accordance with the well-known methods, except that the pulping requires less time and less alkali than usual, by reason of the preliminary treatment of the chips with the dilute alkali. The dissolved humus is without objectionable effect upon the pulping process, for, as is well known, this humus is the first product derived from the wood in the practice of the ordinary soda process, and is therefore present in the solution throughout such process. The alkaline solution may of course be appropriately modified in any manner desired, as for instance by the addition of sodium sulfid, for the practice of the so-called sulfate process of digestion.

We do not claim broadly the treatment of resinous woods with alkali for the preparation of paper pulp, nor do we claim broadly the treatment of resinous woods with weak alkali for the removal of turpentine and resinous substances, since we are aware that such processes are old.

The present process presents decided advantages as compared with those heretofore practised, among which advantages is the fact that the resinous components of the wood may be recovered with substantial completeness and in a state of comparative purity without the expense involved in the use of precipitants, without necessity for concentrating the solution by evaporation to precipitate the resin soaps, and without lessening in any way the availability of the reinforced caustic solution for use in the pulping-process.

The invention is not restricted to the condensation and recovery of turpentine evolved coincidently with the solution of the resinous substances in the diluted alkaline solution.

We claim:—

1. The process of treating resinous woods, which consists in subjecting the same to the action of an alkaline solution under conditions to dissolve the resinous constituents, and precipitating the resinous substances from the resulting solution by adding alkali thereto.

2. The process of treating resinous woods, which consists in subjecting the same to the action of an alkaline solution under conditions to dissolve the resinous constituents and the humus, and thereafter effecting a separation between the resinous substances and the humus by adding alkali to the solution.

3. In a process of treating resinous woods, the step which consists in precipitating resinous substances from an alkaline solution thereof by adding alkali to said solution.

4. In a process of treating resinous woods, the step which consists in precipitating resinous substances from a solution thereof in diluted caustic soda by adding caustic soda to said solution.

5. The process of treating resinous woods, which consists in subjecting the same to the action of an alkaline solution under conditions to dissolve the resinous constitutents, withdrawing the resulting solution and precipitating the resinous substances therefrom by addition of alkali, separating the precipitate and ultilizing the reinforced alkaline solution for pulping the treated wood.

6. The process of treating resinous woods, which consists in subjecting the same to the action of an alkaline solution under conditions to dissolve the resinous constituents, withdrawing the resulting solution, and adding thereto sufficient alkali to bring the total concentration to a degree suitable for pulping wood, thereby precipitating the dissolved resinous substances as resin soaps, and recovering said soaps.

7. The process of treating resinous woods to obtain turpentine, resinous bodies and paper-pulp, which consists in subjecting the same to the action of an alkaline solution under conditions to distil the turpentine and dissolve the resinous constituents of the wood, withdrawing the resulting solution and precipitating the resinous substances therefrom by addition of alkali, separating the precipitated resinous substances, and utilizing the reinforced alkaline solution for pulping the treated wood.

In testimony whereof, we affix our signatures in presence of two witnesses.

MILTON C. WHITAKER.

Witnesses:
  ETTA M. GRITZNER,
  FRANK C. ERB.

JOHN S. BATES.

Witnesses:
  L. F. HAWLEY,
  ARTHUR O. SPIERLING.